United States Patent [19]

Tanioka

[11] Patent Number: 5,018,024

[45] Date of Patent: May 21, 1991

[54] IMAGE PROCESSING APPARATUS USING TWO-DIMENSIONAL SPACE FREQUENCY TO DISCRIMINATE IMAGE TYPE

[75] Inventor: Hiroshi Tanioka, Tokyo, Japan

[73] Assignee: Canon Kabushiki Kaisha, Tokyo, Japan

[21] Appl. No.: 437,310

[22] Filed: Nov. 17, 1989

Related U.S. Application Data

[63] Continuation of Ser. No. 371,643, Jun. 22, 1989, abandoned, which is a continuation of Ser. No. 282,897, Dec. 12, 1988, abandoned, which is a continuation of Ser. No. 682,346, Dec. 17, 1984, abandoned.

[30] Foreign Application Priority Data

Dec. 26, 1983 [JP] Japan .................. 58-244162
Dec. 26, 1983 [JP] Japan .................. 58-244163
Dec. 26, 1983 [JP] Japan .................. 58-244164

[51] Int. Cl.$^5$ .............................. H04M 1/40
[52] U.S. Cl. ................. 358/457; 358/456; 358/462; 382/52
[58] Field of Search .............. 358/453, 455, 298, 456, 358/457, 458, 465, 466, 467; 382/52

[56] References Cited

U.S. PATENT DOCUMENTS

| | | | |
|---|---|---|---|
| 3,973,239 | 8/1976 | Kakumoto et al. | 382/50 |
| 4,138,693 | 2/1979 | Iizuka et al. | 358/436 |
| 4,194,221 | 3/1980 | Stoffel | 358/283 |
| 4,403,257 | 9/1983 | Hsieh | 358/456 |
| 4,414,581 | 11/1983 | Kato et al. | 358/280 |
| 4,495,522 | 1/1985 | Matsunawa | 358/468 |
| 4,503,556 | 3/1985 | Scherl et al. | 382/9 |
| 4,524,385 | 6/1985 | Billingsley et al. | 358/113 |
| 4,547,811 | 10/1985 | Ochi et al. | 358/282 |
| 4,554,593 | 11/1985 | Fox et al. | 358/455 |
| 4,570,186 | 2/1986 | Kurata | 358/282 |
| 4,578,712 | 3/1986 | Matsunawa | 358/283 |
| 4,595,956 | 6/1986 | Kawamura et al. | 358/283 |
| 4,663,662 | 5/1987 | Sekizawa et al. | 358/283 |

FOREIGN PATENT DOCUMENTS

| | | |
|---|---|---|
| 0008739 | 3/1980 | European Pat. Off. |
| 20055834 | 7/1982 | European Pat. Off. |
| 96219 | 12/1983 | European Pat. Off. |
| 2010081 | 2/1984 | European Pat. Off. |
| 2516332 | 10/1976 | Fed. Rep. of Germany |
| 2712286 | 9/1977 | Fed. Rep. of Germany |
| 2948341 | 7/1980 | Fed. Rep. of Germany |
| 31135555 | 10/1982 | Fed. Rep. of Germany |
| 3225415 | 2/1983 | Fed. Rep. of Germany |
| 1549739 | 8/1979 | United Kingdom |
| 2114847 | 8/1983 | United Kingdom |
| 2115256 | 9/1983 | United Kingdom |
| 2127647 | 4/1984 | United Kingdom |
| 2143102 | 1/1985 | United Kingdom |
| 2148660 | 3/1985 | United Kingdom |
| 2103449 | 10/1985 | United Kingdom |

Primary Examiner—Edward L. Coles, Sr.
Attorney, Agent, or Firm—Fitzpatrick, Cella, Harper & Scinto

[57] ABSTRACT

A image processing apparatus capable of faithfully reproducing half tone image, line image and dot image by distinguishing the nature of the original image. The image is discriminated by the distribution of its spatial frequency.

28 Claims, 5 Drawing Sheets

FIG. 1
|  | C1 | C2 | C3 | C4 | C5 | C6 | C7 | C8 |  |
|---|---|---|---|---|---|---|---|---|---|
| | 0 | 5 | 15 | 0 | 0 | 0 | 5 | 5 | $l_1$ |
| | 5 | 15 | 15 | 5 | 0 | 0 | 15 | 15 | $l_2$ |
| | 5 | 15 | 15 | 5 | 0 | 0 | 15 | 15 | $l_3$ |
| | 0 | 5 | 5 | 0 | 5 | 0 | 0 | 0 | $l_4$ |
| | 0 | 0 | 0 | 5 | 15 | 5 | 0 | 0 | $l_5$ |
| | 0 | 0 | 0 | 15 | 15 | 15 | 5 | 0 | $l_6$ |
| | 0 | 0 | 0 | 5 | 15 | 5 | 0 | 0 | $l_7$ |
| | 0 | 0 | 0 | 0 | 5 | 0 | 0 | 0 | $l_8$ |
MAIN SCAN →, SUB-SCAN ↓
FIG. 2
|  | C1 | C2 | C3 | C4 | C5 | C6 | C7 | C8 |  |
|---|---|---|---|---|---|---|---|---|---|
| | 0 | 0 | 1 | 0 | 0 | 0 | 0 | 0 | $l_1$ |
| | 0 | 1 | 1 | 0 | 0 | 0 | 1 | 1 | $l_2$ |
| | 0 | 1 | 1 | 0 | 0 | 0 | 1 | 1 | $l_3$ |
| | 0 | 0 | 0 | 0 | 0 | 0 | 0 | 0 | $l_4$ |
| | 0 | 0 | 0 | 0 | 1 | 0 | 0 | 0 | $l_5$ |
| | 0 | 0 | 0 | 1 | 1 | 1 | 0 | 0 | $l_6$ |
| | 0 | 0 | 0 | 0 | 1 | 0 | 0 | 0 | $l_7$ |
| | 0 | 0 | 0 | 0 | 0 | 0 | 0 | 0 | $l_8$ |
MAIN SCAN →, SUB-SCAN ↓
FIG. 3
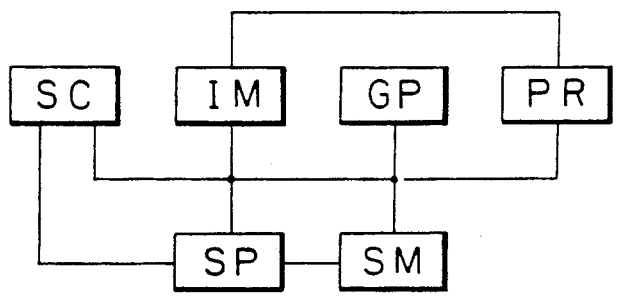
FIG. 5
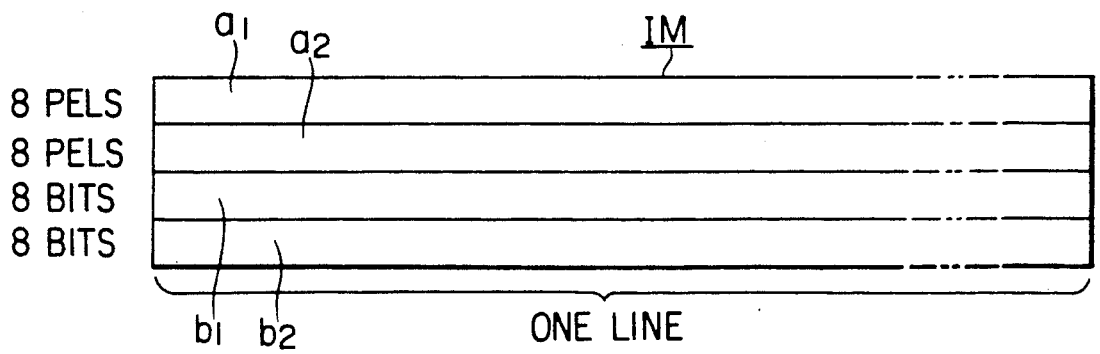

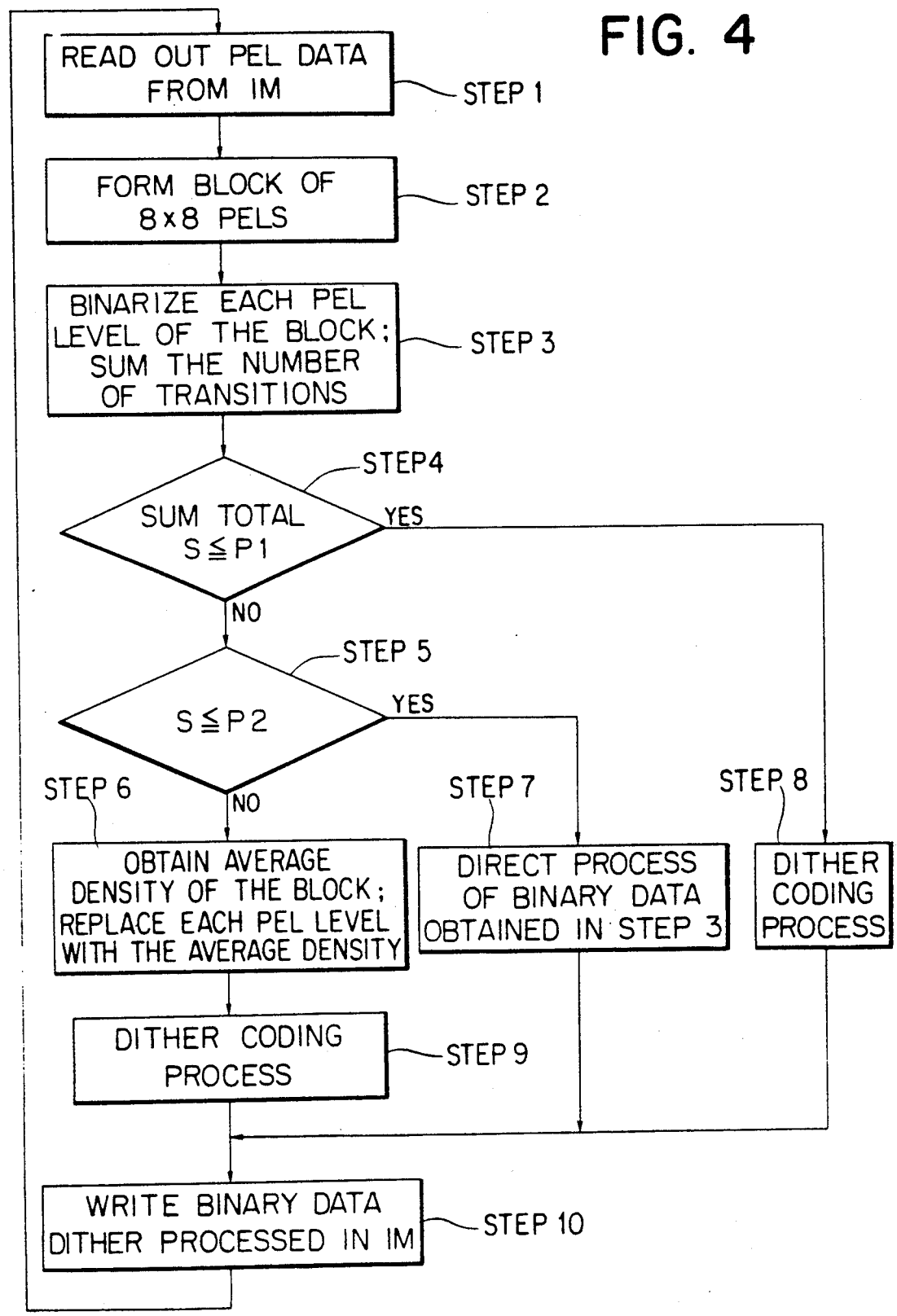

|  | C1 | C2 | C3 | C4 | C5 | C6 | C7 | C8 |  |
|---|---|---|---|---|---|---|---|---|---|
| | 0 | 5 | 5 | 0 | 0 | 0 | 5 | 5 | $\ell_1$ |
| | 5 | 15 | 15 | 5 | 0 | 5 | 15 | 15 | $\ell_2$ |
| | 5 | 15 | 15 | 5 | 0 | 5 | 15 | 15 | $\ell_3$ |
| | 0 | 5 | 5 | 0 | 5 | 0 | 5 | 5 | $\ell_4$ |
| | 0 | 0 | 0 | 5 | 15 | 5 | 0 | 0 | $\ell_5$ |
| | 0 | 0 | 5 | 15 | 15 | 15 | 5 | 0 | $\ell_6$ |
| | 0 | 0 | 0 | 5 | 15 | 5 | 0 | 0 | $\ell_7$ |
| | 0 | 0 | 0 | 0 | 5 | 0 | 0 | 0 | $\ell_8$ |

MAIN SCAN →, SUB-SCAN ↓

| 14 | 10 | 6 | 15 | 14 | 10 | 6 | 15 |
| 5 | 1 | 2 | 11 | 5 | 1 | 2 | 11 |
| 9 | 0 | 3 | 7 | 9 | 0 | 3 | 7 |
| 13 | 4 | 8 | 12 | 13 | 4 | 8 | 12 |
| 14 | 10 | 6 | 15 | 14 | 0 | 6 | 15 |
| 5 | 1 | 2 | 11 | 5 | 1 | 2 | 11 |
| 9 | 0 | 3 | 7 | 9 | 0 | 3 | 7 |
| 13 | 4 | 8 | 12 | 13 | 4 | 8 | 12 |

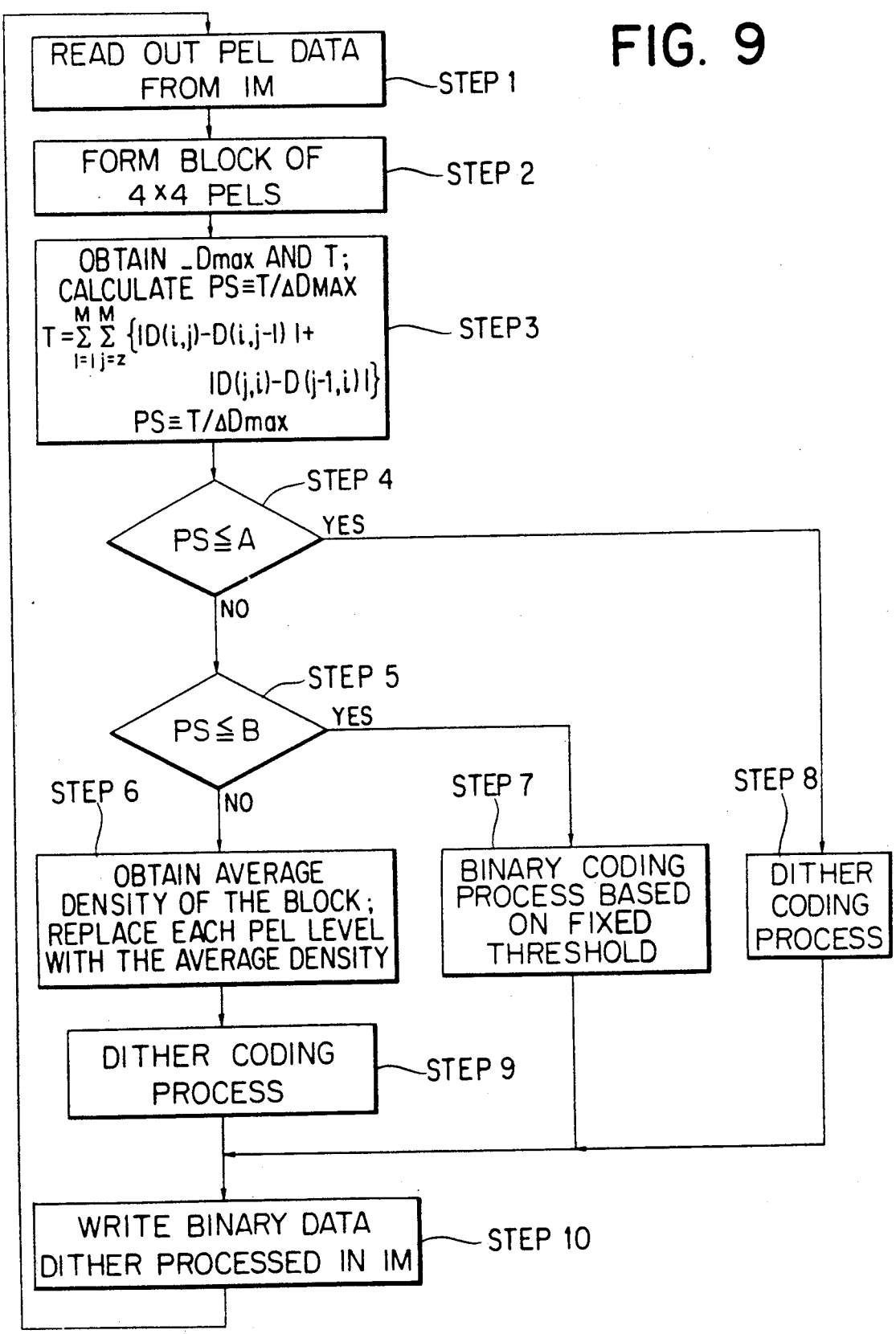

IMAGE PROCESSING APPARATUS USING TWO-DIMENSIONAL SPACE FREQUENCY TO DISCRIMINATE IMAGE TYPE

This application is a continuation of application Ser. No. 07/371,643, filed June 22, 1989, which was a continuation of application Ser. No. 07/282,897 filed Dec. 12, 1988, which was a continuation of application Ser. No. 682,346, filed Dec. 17, 1984, all abandoned.

BACKGROUND OF THE INVENTION

1. Field of the Invention

The present invention relates to an image processing apparatus capable of image discrimination.

2. Description of the Prior Art

The known digital image processing apparatus of this sort only has an insufficient precision in the image identification and is incapable of faithfully reproducing the entire image area of an original including a picture image, a character or a line image and a dot (of screentone) image, since a series of image processing procedures based on erroneous image discrimination is applied over the entire area of the original image. Particularly, it has been difficult to distinguish a dot image from a character or line image, and the dot image cannot be reproduced satisfactorily when processing for a character image area is applied also to a dot image area.

SUMMARY OF THE INVENTION

An object of the present invention is to eliminate the drawbacks mentioned above.

Another object of the present invention is to provided an improvement in an image processing apparatus capable of image discrimination.

Still another object of the present invention is to provide an image processing apparatus capable of exact image discrimination.

Still another object of the present invention is to provide an image processing apparatus capable of providing a reproduced image of a high quality.

Still another object of the present invention is to provide an image processing apparatus capable of providing an image which is a faithful reproduction of the original image.

Still another object of the present invention is to provide an image processing apparatus capable of providing a faithfully reproduced image by exactly discriminating different image areas and applying an appropriate image processing to the nature of image for each image area.

Still another object of the present invention is to provide an image processing apparatus capable of exactly distinguishing a dot image from a character or line Still another object of the present invention is to provide an image processing apparatus capable of high-speed image processing.

According to the present invention, these objects are attained by providing an image processing apparatus in which input image data is binarized, and image tone is discriminated by means of an examination of the characteristics of two dimensional space frequency relating to the input image data, on the basis of the binary data. This processing is preferably carried out with the entered data divided into blocks, the nature of the image in each block being determined individually. More specifically, in one embodiment, the number of transitions of the binary data in a block may be obtained by way of the discrimination. Alternatively, the sum of the differences in density of adjacent image data may be used for the discrimination. The sum is in one embodiment the sum of the absolute values of the differences. The discrimination preferably discriminates half-tone image, line image and dot image. Processing to smooth the image data in each block and, e.g., reproduce a dot image using half-tone processing, may be provided. Non-half-tone processing is preferably also provided for data to which such processing is appropriate. The binarization may be performed on the basis of the average value of the data in a block.

The foregoing and still other objects and features of the present invention will be more fully appreciated from the following detailed description of the preferred embodiments, which is to be taken in conjunction with the attached drawings.

BRIEF DESCRIPTION OF THE DRAWINGS

FIG. 1 is a chart showing density distribution when an original is divided into image blocks of 8×8 pixels each;

FIG. 2 is a chart showing an example of an binary digitized pattern obtained from the original shown in FIG. 1;

FIG. 3 is a block diagram showing an embodiment of the image processing apparatus of the present invention;

FIG. 4 is a flow chart showing the procedure of image processing executed by a microprocessor GP;

FIG. 5 is a schematic view showing the structure of an image memory IM;

FIG. 9 is a flow chart showing the procedure of image processing in a third embodiment of the present invention.

DETAILED DESCRIPTION OF THE PREFERRED EMBODIMENTS

Figures 6, 7, 10:
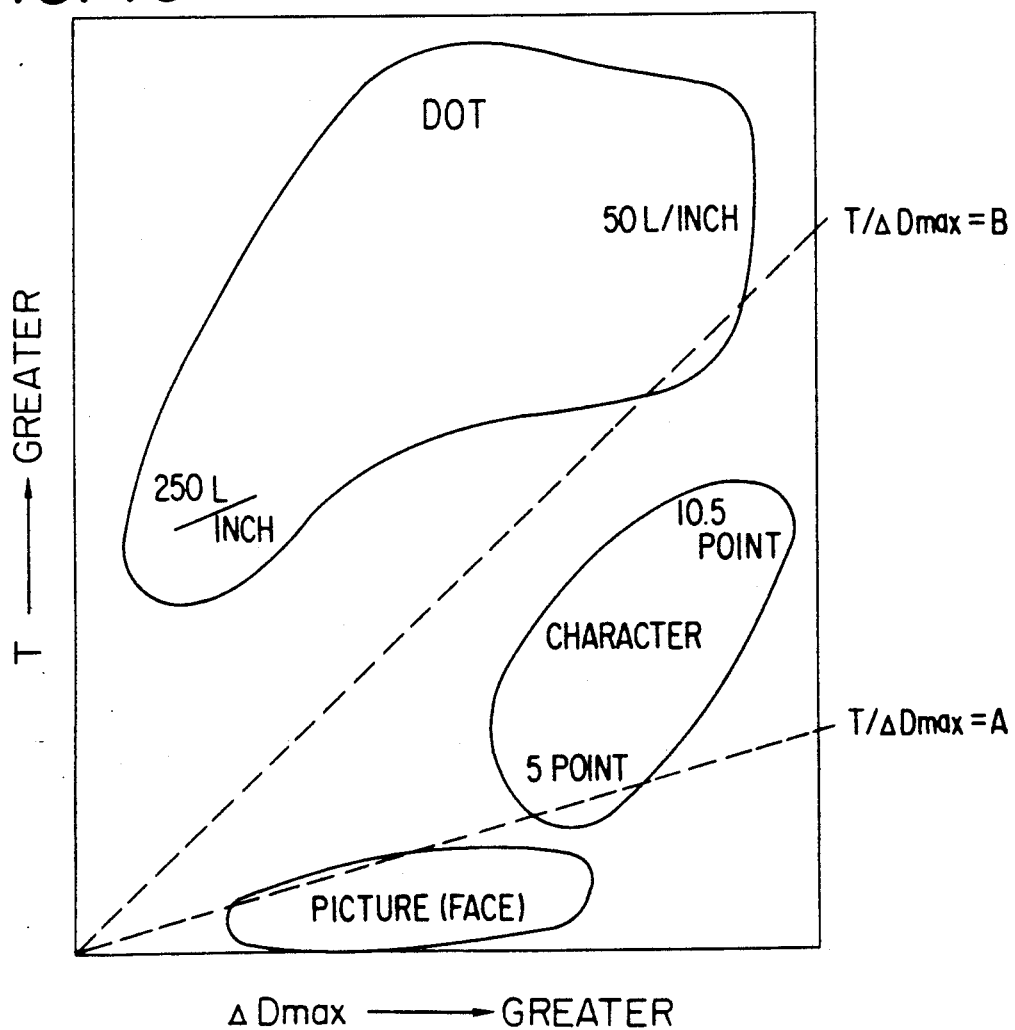
FIG. 6 is a chart showing an example of density distribution when the original image is divided into image blocks of 8×8 pixels each.
FIG. 7 is a chart showing an example of a dither matrix.
FIG. 10 is a chart showing the relationship between T and $\Delta D_{max}$ in various images.

Now the present invention will be clarified by detailed description of the preferred embodiments thereof shown in the attached drawings.

[1ST EMBODIMENT]

First will be explained in steps the image discriminating algorithm of the present embodiment.

(Step 1)

An original image is read with a scanner, for example, composed of a charge-coupled device, and is digitized to obtain a digital image, which is then divided into blocks of N×M pixels each, wherein N indicates the number of pixels in the main scanning direction, while M indicates the number of pixels in the subsidiary scanning direction. In the case that the scanner has a resolving power of 16 pixels/mm, for example, it is found that M and N should preferably be equal to 8. It is therefore assumed that the image is divided into blocks of 8×8 pixels.

(Step 2)

The density of each pixel in each block is binary-digitized with a fixed threshold value to obtain a binary block pattern. Then, in said binary block pattern, there is determined the sum S of the number of transitions of binary levels between immediately neighboring pixels.

As an example, in an image block of $N \times M = 8 \times 8$ shown in FIG. 1, in which the density in each pixel can vary from 0 (white) to 15 (black), a binary digitizing with a fixed threshold value at a level 7 provides a binary block pattern shown in FIG. 2. In the first main scanning line 11 (uppermost row), there exist two transitions $$(0 \rightarrow 0 \rightarrow 1 \rightarrow 0 \rightarrow 0 \rightarrow 0 \rightarrow 0 \rightarrow 0).$$
$$\phantom{xxxxx}1\phantom{xxx}2$$

The total number S of the transitions in all the main and subsidiary scanning lines is equal to 27 in the example shown in FIG. 2. It is to be noted that said number S may vary from 0 to $M(N-1) + N(M-1)$.

(Step 3)

The average of the densities of the pixels in the thus divided block is determined. In the example shown in FIG. 1, the average density is approximately equal to 5. Said average density may be employed in obtaining the binary block pattern in Step 2.

(Step 4)

The aforementioned total number S obtained in each block is compared with pre-determined values P1, P2 to discriminate the nature of the image according to the following criteria:

(1) $S \leq P1$     Picture (half tone) image area
(2) $P1 < S \leq P2$     Character (line) image area
(3) $S > P2$     Dot image area wherein $P1 < P2$.

The above-mentioned criteria of discrimination are based on the statistics that the two-dimensional spatial frequency of the original decreases in the order dot image > character image > picture image, and, in the present embodiment there are practically employed a value in a range of 8-10 for P1 and a value in a range of 20-24 for P2. In the present embodiment the total number S of transitions is determined on a binary block pattern obtained with a fixed threshold value from each block, but it is also possible to use two fixed threshold values to obtain two binary block patterns, to determine the total number of transitions in each binary block pattern and to discriminate the nature of the image according to the result of these calculations. In any case it is required to obtain a value enabling to discriminate the two-dimensional variation of the image density.

(Step 5)

The pixels in each block are converted into binary image signals according to the result of discrimination in Step 4.

(5-1) : In the case that the block is discriminated as a picture image area, the pixels in the block are subjected to a dither process, in which the image densities in the block are respectively compared with threshold values for example in an $8 \times 8$ threshold value matrix to obtain binary signals "1" or "0".

(5-2) : In the case that the block is discriminated as a character image area, the binary block pattern as shown in FIG. 2 is released without further process. Otherwise the binary block pattern may be obtained by binary digitizing in which the average density determined in Step 3 is used as a fixed threshold value.

(5-3) : In case the block is discriminated as a dot image area, the densities of the pixels in the block are replaced by the average density ("5" in this example) obtained in the Step 3 before proceeding to the dither processing. Stated differently, the process employed in the dot image area is so-called density pattern processing, and the dither matrix to be employed in this case is preferably of a dot concentrated type, in which, as shown in FIG. 7, the threshold value gradually increases or decreases around a certain point. It is rendered possible to suppress noises which are generally generated as Moire stripes as the result of interference between a dot image of a high spatial frequency and the pattern of the dither matrix for binary digitizing, by calculating the average density for each block and applying a dither matrix of the dot concentrated type.

Steps 1 to 5 of the above-described algorithm are repeated in succession for different blocks, and it is rendered possible to binary digitize on original document on a semi-real time basis for image reproduction on a binary printer such as a laser beam printer.

Now there will be explained an embodiment of the image processing apparatus of the present transition, which performs the above-explained image processing by means of a computerized procedure, particularly the software of a microcomputer designed exclusively for image processing and having the structure of a multi-microprocessor. FIG. 3 is a block diagram of the structure of the present embodiment, in which are shown a scanner SC composed of a charge-coupled device for reading the original image, a microprocessor GP exclusively for image processing, and a laser beam printer PR. The original image is read by the scanner SC, and the obtained image signal is subjected to analog-to-digital conversion by an unrepresented A/D converter and temporarily stored in an image memory IM. The image data in the image memory IM are processed by a software of the microprocessor GP according to the aforementioned algorithm for conversion into binary signals, which are supplied to the laser beam printer PR. A microprocessor SP controls the entire system according to a program stored in a program memory SM, and the image memory IM is utilized in the course of the image processing.

FIG. 4 is a flow chart showing the procedure of image processing executed by the microprocessor GP shown in FIG. 3. In the illustrated procedure, steps 1 and 2 take image data from the image memory IM and form blocks of $8 \times 8$ pixels each, and Step 3 binary digitizes the data of each pixel in the block with a fixed threshold value and determines the total number S of the transitions Steps 4 and 5 discriminate the nature of the image according to the thus determined number S. If the discriminations at steps 4 and 5 both provide negative results, the block is discriminated as a screen-tone image area and Step 6 determines the average density in the block and replaces the data of the pixels in said block with said average density. Then Step 9 applies a dither process to the block in which the density is homogenized. On the other hand, in the case that the discriminations in Steps 4 and 5 respectively provide negative and affirmative results, the block is discriminated as a character image area and the program proceeds to Step 7, which releases the binary data obtained in Step 3 without any change. In case the discrimination in Step 4 provides an affirmative result, the block is discriminated as a picture image area, and the block is subjected to a dither process in Step 8. Step 10 stores the binary data of the block obtained in Steps 7, 8 or 9 into the image memory IM.

In the present embodiment, the image memory IM is so constructed, as shown in FIG. 5, to store at least pixel data of multiple levels of 16 lines and binary data of 16 lines, wherein a line corresponds for example to a main scanning line read by the scanner. Memory areas a1, a2 are used for storing the pixel data sequentially read by the scanner SC and for reading said data in a unit of $8 \times 8$ pixels. For example the memory area a1 serially stores the pixel data from the scanner SC, while pixel data in the unit of each block of $8 \times 8$ pixels are read from the memory area a2 by the microprocessor GP. Also for example a memory area b1 is used for storing binary data of each block of $8 \times 8$ pixels by the microprocessor GP, while binary image data already stored are sequentially read in the direction of scanning lines from a memory area b2, and supplied to the printer PR for image reproduction. In this manner the present embodiment simultaneously performs, through parallel data processing with plural microcomputers, the write-in of multi-level pixel data and the read-out in the unit of block of multi-level pixel data, and also simultaneously performs the write-in of binary data in the unit of a block and the read-out of binary data. It also can calculate the parameter S two-dimensionally at a high speed and can therefore process and release the image data on substantially real time basis. The scanner SC and the printer PR are controlled by the microprocessor SP in synchronization with the microprocessor GP.

In the following there will be explained, as a variation of the foregoing first embodiment, the binary digitizing method for the preparation of the binary block pattern in the Step 2. Though a genuine binary digitizing with a fixed threshold value "7" is employed in the foregoing embodiment, it is also possible, for improving the precision of discrimination of a picture image area, to inspect the change in the density in the main or subsidiary scanning direction, and invert the binary signal (for example from "0" to "1") when the difference in the densities between the neighboring pixels exceeds a determined value $\Delta L$. As an example, if a photographic image area shows a density distribution $5 \rightarrow 7 \rightarrow 6 \rightarrow 6 \rightarrow 8$ for a $\Delta L$ equal to 7, the corresponding binary density pattern is $0 \rightarrow 0 \rightarrow 0 \rightarrow 0 \rightarrow 0$, thus including no transitions. Since a drastic density change rarely appears in a picture image area, this method allows a more accurate discrimination of the picture image area.

It is also effective to determine the difference between the density of a pixel and the average density of 8 pixels two-dimensionally surrounding said pixel and to invert the binary signal when said difference exceeds a determined value $\Delta L$.

In the foregoing embodiment three binary digitizing processes are selectively applied to the image data according to the result of discrimination thereof, but it is also possible to achieve a faster image processing by applying three binary digitizing processes in parallel to the same image data and selecting one of three series of binary image data thus obtained according to the result of discrimination.

[2ND EMBODIMENT]

In the following there will be stepwise explained in steps the image discriminating algorithm in a second embodiment of the present invention.

(Step 1)

An original image is read with a scanner composed, for example, of a charge-coupled device, and is digitized to obtain a digital image, which is then divided into blocks of $N \times M$ pixels each, wherein N indicates the number of pixels in the main scanning direction, while M indicates the number of pixels in the subsidiary scanning direction. In the case that the scanner has a resolving power of 16 pixels/mm, it is found that M and N should preferably be equal to 8. It is therefore assumed that the image is divided into blocks of $8 \times 8$ pixels.

(Step 2)

In each divided block, there is determined, in the main and subsidiary scanning directions, the density difference between immediately neighboring pixels, and a total sum T of the absolute values of said differences is calculated. As an example, in a block of $N \times M = 8 \times 8$ as shown in FIG. 6, there is obtained a sum $T = 455$. Said sum T is obtained according to an equation (1) to be explained in connection with a third embodiment of the present invention.

In the above-shown example in which the density can vary from 0 (white) to 15 (black), the sum T may vary from 0 to 1680 according to the nature of the image.

(Step 3)

The average of the densities of the pixels in thus divided block is determined. In the example shown in FIG. 6, the average density is approximately equal to 5.

(Step 4)

The aforementioned total sum T obtained in each block is compared with predetermined values R1, R2 to identify the nature of the image according to following criteria:

(1) $T \leq R1$      Picture (half tone) image area (2) $R1 < T \leq R2$      Character (line) image area (3) $T > R2$      Dot image area wherein $R1 < R2$.

The above mentioned criteria of discrimination are based on the statistics that the two-dimensional spatial frequency of the original decreases in the order of dot image > character image > picture image, and the values R1, R2 are determined according to the reproducing ability of the apparatus for character and dot images.

In the present embodiment the total sum T of the absolute values of the density difference between the neighboring pixels is determined for each block, but it is also possible to obtain a parameter representing the nature of the image by applying a determined operation to the density difference between the neighboring pixels. In any case it is required to obtain a value enabling to identify the two-dimensional variation of the image density.

(Step 5)

The pixels in each block are converted in to binary image signals according to the result of discrimination in Step 4.

(5-1): In the case that the block is discriminated as a picture image area, the pixels in the block are subjected to a dither processing, in which the image densities in the block are respectively compared with threshold values, for example, in an 8×8 threshold value matrix to obtain binary signals "1" or "0". The dither matrix shown in FIG. 7 is of dot concentrated type capable of reproducing 16 density levels. The densities shown in FIG. 6 are binary digitized by the corresponding threshold values in the dither matrix to obtain white "1" and black "0" signals.

(5-2): In the case that the block is discriminated as a character image area, there is effected a complete binary digitizing with a fixed threshold value. In the present embodiment, a threshold value "7" equal to a half of the maximum density level is adopted for binary digitizing, but it is also effective to select the threshold value in response to the background density (for example the minimum density or most frequently appearing density) of the original image in the block. Also the average density in each block may be adopted as the threshold value.

(5-3): In the case that the block is discriminated as a dot image area, the densities of the pixels in the block are replaced by the average density obtained in Step 3, before proceeding to the dither process with the dither matrix shown in FIG. 7. Stated differently, the process employed in the dot image area is a so-called density pattern processing, and the dither matrix to be employed in this case is preferably of a dot concentrated type, because it is possible to suppress noises generally generated as Moire stripes as the result of interference between a dot image of a high spatial frequency and the pattern of the dither matrix for binary digitizing, by calculating the average density for each block and applying a dither matrix of the dot concentrated type.

Steps 1 to 5 of the above-described algorithm are repeated in succession for different blocks, and it is rendered possible to binary digitize an original document on a semi-real time basis for image reproduction on a binary printer such as a laser beam printer.

Now there will be explained an image processing apparatus of the second embodiment of the present invention.

As in the first embodiment, the image processing apparatus of the second embodiment performs the above-explained image processing by means of a computerized procedure, particularly a software of a microcomputer designed exclusively for image processing and having the structure of multi-microprocessor.

The circuit structure can be same as that shown in FIG. 3 and will not therefore be explained in detail.

Figure 8:
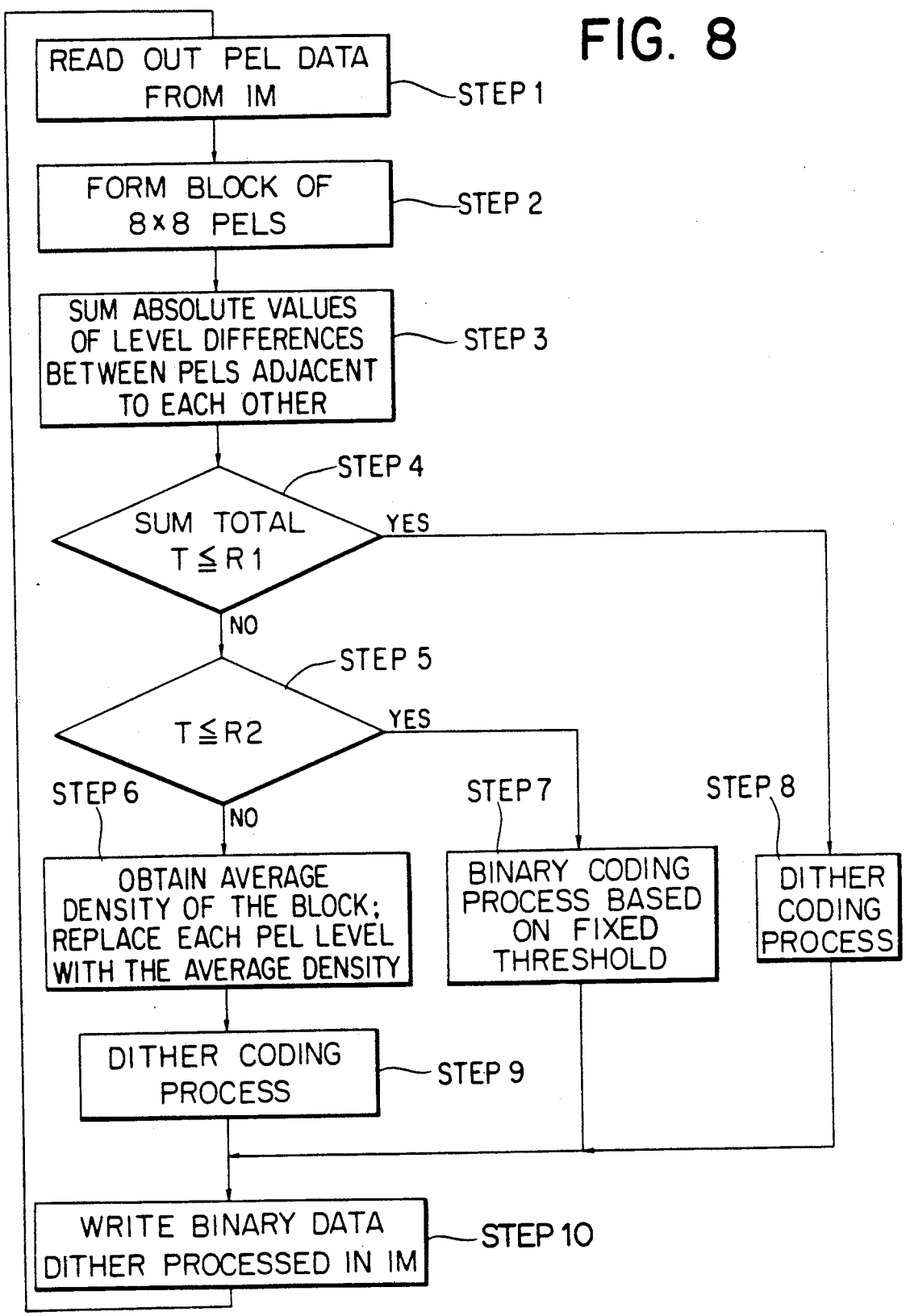
FIG. 8 is a flow chart showing the procedure of image processing in a second embodiment of the present invention.

FIG. 8 is a flow chart showing the procedure of image processing executed by the microprocessor GP. In the illustrated procedure, Steps 1 and 2 take image data from the image memory IM and form blocks of 8×8 pixels each, and Step 3 determines the total sum T of the absolute values of the density differences between the immediately neighboring pixels in the block as explained before. Steps 4 and 5 identify the nature of the image according to thus determined sum T. In the case that the discriminations in Steps 4 and 5 both provide negative results, the block is identified as a dot image area and a Step 6 determines the average density in the block and replaces the data of the pixels in the block with said average density. Then a Step 9 applies a dither processing to the block in which the density is homogenized. On the other hand, in the case that the discriminations in Steps 4 and 5 respectively provide negative and affirmative results, the block is discriminated as a character image and the program proceeds to Step 7, in which the pixels in the block are binary digitized with a fixed threshold value. In the case that the discrimination in Steps 4 provides an affirmative result, the block is discriminated as a picture image area, and the block is subjected to a dither processing in Step 8. A step 10 stores the binary data of the block obtained in Steps 7, 8 or 9 into the image memory IM.

Also in the second embodiment, the image memory IM is capable, as shown in FIG. 5, of storing at least pixel data of multiple levels of 16 lines and binary data of 16 lines, wherein a line corresponds for example of a main scanning line read by the scanner. Memory areas a1, a2 are used for storing the pixel data sequentially read by the scanner SC and for reading said data in a unit of 8×8 pixels. For example the memory area a1 serially stores the pixel data from the scanner SC, while pixel data in the unit of a block of 8×8 pixels are read from the memory area a2 by the microprocessor GP. Also for example, a memory area b1 is used for storing binary data of each block of 8×8 pixels by the microprocessor GP, while binary image data already stored are sequentially read in the direction of scanning line from a memory area b2 and supplied to the printer PR for image reproduction. In this manner the present embodiment simultaneously performs, through parallel data processing with plural microcomputers, with write-in of multi-level pixel data and the read-out in the unit of block of multi-level pixel data, and also simultaneously performs the write-in of binary data in the unit of a block and the read-out of binary data. It also can calculate the parameter T two-dimensionally at a high speed and can therefore process and release the image data on substantially a real time basis.

In the foregoing embodiment three binary digitizing processes are selectively applied to the image data according to the result of discrimination thereof, but it is also possible to achieve a faster image processing by applying three binary digitizing processes in parallel manner to same image data and selecting one of three series of binary image data thus obtained according to the result of discrimination.

(3RD EMBODIMENT)

In the following there will be explained in steps the image discriminating algorithm in a third embodiment of the present invention.

(Step 1)

An original image is read with a scanner composed for example of a charge-coupled device, and is digitized to obtain a digital image, which is then divided into blocks of N×M pixels each, wherein N indicates the number of pixels in the main scanning direction, while M indicates the number of pixels in the subsidiary scanning direction. In the case that the scanner has a resolving power of 16 pixels/mm, the most preferred value for M is 4 or 8.

(Step 2)

In each of the thus divided blocks there are calculated the total sum T of the absolute values of the density differences between the immediately neighboring pixels and a maximum density difference $\Delta D_{max}$ between the maximum and minimum densities in said block, and an image tone parameter $PS = T/\Delta D_{max}$ is calculated for each block.

Said sum T is obtained by the following equation:

$$T = \sum_{j=2}^{M} \sum_{i=1}^{M} \{|D(i,j) - D(i,j-1)| + |D(j,i) - D(j-1,i)|\} \quad (1)$$

wherein $D(i,j)$ represents the density of each pixel in the block and said image tone parameter PS can be regarded as a value equivalent to the two-dimensional spatial frequency. Consequently the variation of the image density can be two-dimensionally discriminated from said parameter PS.

(Step 3)

The aforementioned parameter PS obtained in Step 2 is utilized to identify the nature of the image according to following criteria:

(1) $PS \leq A$    Picture (half tone) image area (2) $A < PS \leq B$    Character (line) image area (3) $B < PS$    Dot image area wherein A and B are predetermined values, and, for example, A is selected in a range from 1 to 2 while B is selected equal to or larger than 8.

(Step 4)

Binary digitizing is conducted in one of following three methods according to the image tone discriminated in Step 3:

(i) For a picture (half tone) image area:

"1" for $D(i,j) > M(i,j)$

"0" for $D(i,j) \leq M(i,j)$ wherein $M(i,j)$ represents an array of threshold values generally called a dither matrix of a size which, in the present embodiment, is same as that of the block ($M \times M$) but is generally represented as $2n \times 2n$ ($n = 1, 2, 3, \ldots$). The distribution of the threshold values in said matrix can be a scattered type as represented by Beyer's matrix, a concentrated type resembling a dot screen, or any other types:

(ii) For a character (line) image area:

"1" for $D(i,j) > K$

"0" for $D(i,j) \leq K$ wherein K is a fixed threshold value approximately equal to half of the maximum density. For example, if the maximum density is at the 63th level, K is selected at about 31st level:

(iii) For a dot tone image area:

"1" for $\frac{1}{M^2} \sum_{j=1}^{M} \sum_{i=1}^{M} D(i,j) > M(i,j)$

"0" for $\frac{1}{M^2} \sum_{j=1}^{M} \sum_{i=1}^{M} D(i,j) \leq M(i,j)$

In this case the average density is determined in the block and is binary digitized with the dither matrix $M(i,j)$. A reproduction more faithful to the original is possible by the use of a dither matrix of a dot concentrated type.

A higher speed in the data processing can be attained by processing the same image data with the above-described processes in parallel and selecting one of thus obtained three series of binary digitized data according to the result of discrimination.

Now there will be explained an image processing apparatus of the third embodiment of the present invention.

As in the first embodiment, the image processing apparatus of the third embodiment performs the above-explained image processing by means of a computerized procedure, particularly the software of a microcomputer designed exclusively for image processing and having a structure of multiple microprocessors.

The circuit structure can be same as that shown in FIG. 3 and will not therefore be explained in detail.

FIG. 9 is a flow chart showing the procedure of image processing executed by the microprocessor GP. In the illustrated procedure, Steps 1 and 2 take image data from the image memory IM and form blocks of $4 \times 4$ or $8 \times 8$ pixels each, and a Step 3 determines the maximum density difference $\Delta D$ between the maximum and minimum densities, and calculates the total sum T of the absolute values of the density differences between the immediately neighboring pixels according to the equation (1), thus determining the image tone parameter $PS = T/\Delta D_{max}$ Steps 4 and 5 discriminate the nature of the image according to thus determined parameter PS. In case the discriminations at the steps 4 and 5 both provide negative results, the block is discriminated as a dot image area and a Step determines the average density in the block and replaces the data of the pixels in the block with said average density. Then Step 9 applies a dither process to the block in which the density is homogenized. On the other hand, in the case that the discriminations in Steps 4 and 5 respectively provide negative and affirmative results, the block is discriminated as a character image area and the program proceeds to Step 7, in which the pixels in the block are binary digitized with a fixed threshold value. In the case that discrimination in Step 4 provides an affirmative results, the block is discriminated as a picture image area, and the block is subjected to a dither processing in Step 8. Step 10 stores the binary data of the block obtained in Steps 7, 8 or 9 into the image memory GM.

In the case that of data processing for a block of $8 \times 8$ pixels in the third embodiment, the image memory GM is capable, as shown in FIG. 5, of storing at least the multi-level pixel data of 16 lines and binary pixel data of 16 lines, in which a line discriminates a main scanning line read for example by the scanner. Memory areas a1, a2 are used for storing the pixel data sequentially read by the scanner SC and for reading said data in a unit of $8 \times 8$ pixels. For example, the memory area a1 serially stores the pixel data from the scanner SC, while pixel data in the unit of a block of $8 \times 8$ pixels are read from the memory area a2 by the microprocessor GP. Also, for example, a memory area b1 is used for storing binary data of each block of 8×8 pixels by the microprocessor GP, while binary image data already stored are sequentially read in the direction of scanning line from a memory area b2 and supplied to the printer PR for image reproduction. In this manner the present embodiment simultaneously performs, through parallel data processing with plural microcomputers, with write-in of multi-level pixel data and the read-out in the unit of block of multi-level pixel data, and also simultaneously performs the write-in of binary data in the unit of a block and the read-out of binary data. It also can calculate the parameter PS at a high speed and can therefore process and release the image data on substantially real time basis.

FIG. 10 shows a planer plotting of the maximum density difference $\Delta D_{max}$ in a block as a function of the total sum T of the absolute values of the density differences between the neighboring pixels for various images, including picture, character and dot images. FIGS. in the dot images represent the density of the screen, while those in the character images represent the character size. Picture images are principally of human faces. As will be understood from FIG. 10, the parameter $T/\Delta D_{max}$ can clearly separate the domains of these images.

Furthermore, the present embodiment allows one to significantly improve the precision of distinction between a high-density dot image area and a character image area.

Constants employed in FIG. 10 are: M=4, A=1 to 2, and B=8 or larger.

In the foregoing embodiment, the image tone parameter PS is defined by $T/\Delta D_{max}$, but said parameter may diverge to infinity in a picture image area where T and $\Delta D_{max}$ may converge to zero. In order to avoid such inconvenience, the image tone parameter may be also be defined in the following manner:

$$PS \equiv T/(\Delta D_{max}+C1) \quad (1)$$

wherein C1 is a constant; or $$PS \equiv T/\Delta D_{max} \text{ for } \Delta D_{max} > C2 \text{ or} \quad (2)$$

$$PS = T/C2 \text{ for } \Delta D_{max} \leq C2$$

wherein $PS = T/\Delta D_{max}$, and C2 is a constant.

In the foregoing embodiment the image tone parameter PS is calculated from the maximum density difference $\Delta D_{max}$, but said difference may be replaced by the average density in the block or by the arithmetic average of the maximum and minimum densities in the block.

The foregoing embodiments discriminate the nature of image of each block, but it is also possible, with the above-described methods, to discriminate each pixel. In this case plural pixels surrounding an object pixel are taken as a block, to which the above-described methods are applied to discriminate said object pixel. In this manner it is rendered possible to determined the processing method for each pixel and to obtain a more faithful reproduction of the image.

The present invention is not limited to the foregoing embodiments but is subject to various modifications within the scope and spirit of the appended claims.

What is claimed is:

1. An image processing apparatus comprising:
   image data input means; and
   means for processing image data entered by said input means,
   wherein said processing means includes means for binarizing the image data inputted from said input means to produce binary data and means for discriminating image tone by examining characteristics of two-dimensional space frequency relating to the inputted image data by discriminating continuity of the adjacent binary data binarized by said binarizing means.

2. An image processing apparatus according to claim 1, wherein said discriminating means is adapted to divide the entered image data into plural blocks and to discriminate a nature of image of each block, each of the blocks having plural image data.

3. An image processing apparatus according to claim 2, wherein said processing means includes means for smoothing each said image data in said block and reproducing a dot image by half-tone processing the smoothed image data, said smoothing/reproducing means being selected in accordance with a result of discrimination performed by said discrimination means.

4. An image processing apparatus according to claim 2, wherein said binarizing means binarizes the entered image data by using an average value of the image data in said block.

5. An image processing apparatus according to claim 1, wherein said processing means includes half-tone processing means for half-tone processing the entered image data and non-half-tone processing means for non-half-tone processing the entered image data, said half-tone processing means or said non-half-tone processing means being selected in accordance with a result of discrimination performed by said discrimination means.

6. An image processing apparatus according to claim 1, wherein said discriminating means discriminates the image tone of the image data by examining continuity of the binary data at least in a row direction of a two dimensional block, the two dimensional block comprising a plurality of binary data in the row and column directions thereof.

7. An image processing apparatus, comprising:
   image data input means; and
   means for processing image data entered by said input means,
   wherein said processing means includes means for binarizing the image data inputted from said input means to produce binary data and means for discriminating image tone by examining characteristics of two-dimensional space frequency relating to the inputted image data on the basis of the binary data,
   wherein said discriminating means is adapted to divide the entered image data into plural blocks and to discriminate a nature of image of each block, each of the blocks having plural image data, and
   wherein, for each of the blocks, said binarizing means is adapted to binarize each image data in the block to obtain the binary data and said discriminating means is adapted to obtain a number of transitions of said binary data, thereby discriminating the nature of image for each block according to the number of transitions.

8. An image processing apparatus, comprising:
   image data input means; and
   means for processing image data entered by said input means, wherein said processing means includes means for binarizing the image data inputted from said input means to produce binary data and means for discriminating image tone by examining characteristics of two dimensional space frequency relating to the inputted image data on the basis of the binary data, and wherein said discriminating means is adapted to obtain a number of transitions of the binary data and discriminate image tone in accordance with the number of transitions.

9. An image processing apparatus according to claim 8, wherein said discriminating means is adapted to identify whether said entered image data represents a half-tone image, a line image or a dot image.

10. An image processing apparatus comprising:
image data input means; and
means for processing image data entered by said input means,
wherein said processing means includes means for binarizing the image data inputted from said input means to produce binary data and means for discriminating image tone by examining characteristics of two-dimensional space frequency relating to the inputted image data,
wherein said discriminating means is adapted to divide the entered image data into plural blocks and to discriminate a nature of image of each block, each of the blocks having plural image data,
wherein said processing means includes means for smoothing each said image data in said block and reproducing a dot image by half-tone processing the smoothed image data, said smoothing/reproducing means being selected in accordance with a result of discrimination performed by said discrimination means, and
wherein said reproducing means comprises dither process means for applying a dither process to each smoothed image data in said block.

11. An image processing apparatus comprising:
pixel data input means; and
means for processing pixel data entered by said input means;
said processing means including means for dividing said entered pixel data into plural blocks and discriminating a nature of image for each block, each said block having a plurality of pixel data; and
said dividing/discriminating means providing a sum of differences in density of pixel data adjacent to each other and discriminating image tonality on the basis of the sum.

12. An image processing apparatus according to claim 11, wherein said discriminating means provides the sum of an absolute value of differences in density of the pixel data adjacent to each other and discriminates image tone on the basis of the sum.

13. An image processing apparatus according to claim 12, wherein said discriminating means provides the maximum difference in density of the pixel data in said block and discriminates image tone on the basis of the sum and the maximum difference.

14. An image processing apparatus according to claim 13, wherein said discriminating means discriminates image tone on the basis of a value obtained by dividing the sum by the maximum difference in density.

15. An image processing apparatus according to claim 11, wherein said discriminating means is adapted to identify whether each block represents a half-tone image, a line image or a dot image.

16. An image processing apparatus according to claim 11, wherein said processing means includes means for smoothing each said image data in said block and reproducing a dot image by half-tone processing the smoothed image data, said smoothing/reproducing means being selected in accordance with a result of discrimination performed by said discrimination means.

17. An image processing apparatus according to claim 11, wherein said processing means includes half-tone processing means for half-tone processing the entered pixel data and non-half-tone processing means for non-half-tone processing the entered pixel data, said half-tone processing means or said half-tone processing means being selected in accordance with a result of discrimination performed by said discrimination means.

18. An image processing apparatus comprising:
image data input means; and
means for processing image data entered by said input means,
wherein said processing means includes means for binarizing the image data inputted from said input means to produce binary data and means for discriminating image tone by examining characteristics of two-dimensional space frequency relating to the inputted image data by discriminating continuity of the adjacent binary data,
wherein said discriminating means is adapted to divide the entered image data into plural blocks and to discriminate a nature of image of each block, each of the blocks having plural image data,
wherein said processing means includes means for smoothing each said image data in said block and reproducing a dot image by half-tone processing the smoothed image data, said smoothing/reproducing means being selected in accordance with a result of discrimination performed by said discrimination means, and
wherein said reproducing means comprises dither process means for applying a dither process to each smoothed image data in said block.

19. An image processing apparatus comprising:
image data input means; and
means for processing image data entered by said input means,
wherein said processing means includes means for binarizing the image data entered from said input means to produce binary data and means for discriminating image tone of the entered image data on the basis of the binary data, and wherein said processing means further comprises selecting means for selecting the binary data produced by said binarizing means as reproduction data for image reproduction in accordance with a result of discrimination performed by said discriminating means.

20. An image processing apparatus according to claim 19, wherein said discriminating means is adapted to divide the entered image data into plural blocks and to discriminate a nature of image of each block, each of the blocks having plural image data.

21. An image processing apparatus according to claim 20, wherein, for each of the blocks, said binarizing means is adapted to binarize each image data in the block to obtain the binary data and said discriminating means is adapted to obtain a number of transitions of said binary data, to discriminate the nature of image for each block according to the number of transitions.

22. An image processing apparatus according to claim 19, wherein said discriminating means is adapted to obtain a number of transitions of the binary data and discriminate image tone in accordance with the number of transitions.

23. An image processing apparatus comprising:
image data input means; and
means for processing image data entered by said input means,
wherein said processing means includes means for binarizing the image data inputted from said input means to produce binary data and means for discriminating image tone by examining characteristics of two-dimensional space frequency relating to the inputted image data by discriminating continuity of the adjacent binary data,
wherein said discriminating means is adapted to divide the entered image data into plural blocks and to discriminate a nature of image of each block, each of the blocks having plural image data,
wherein for each of the blocks, said binarizing means is adapted to binarize each image data in the block to obtain the binary data and said discriminating means is adapted to obtain a number of transitions of said binary data to distinguish the continuity, thereby discriminating the nature of image of each block according to the number of transitions.

24. An image processing apparatus comprising:
image data input means; and
means for processing image data entered by said input means,
wherein said processing means includes means for discriminating the image tone of the image data inputted by said input means, said discriminating means discriminating image tone of the image data by examining the characteristics of two-dimensional space frequency relating to the inputted image data by discriminating the continuity of the image data in a two-dimensional block, the two-dimensional block comprising a plurality of image data in the row and column directions thereof.

25. An image processing apparatus according to claim 24, wherein said discriminating means discriminates the image tone of the image data by examining the continuity of the image data at least in the row direction of the two dimensional block.

26. An image processing apparatus according to claim 25, wherein said discriminating means discriminates the image tone of the image data by examining the continuity of the image data at least in the column direction of the two dimensional block.

27. An image processing apparatus according to claim 24, wherein said discriminating means discriminates the image tone by examining characteristics of two dimensional space frequency relating to the inputted image data by discriminating the continuity of the adjacent image data in the two dimensional block.

28. An image processing apparatus according to claim 27, wherein said processing means includes means for binarizing the image data to produce binary data, and wherein said discriminating means discriminates the image tone of the inputted image data by utilizing the binary data.

* * * * *

UNITED STATES PATENT AND TRADEMARK OFFICE
CERTIFICATE OF CORRECTION

PATENT NO. : 5,018,024

DATED : May 21, 1991

INVENTOR(S) : HIROSHI TANIOKA, ET AL.      Page 1 of 4

It is certified that error appears in the above-identified patent and that said Letters Patent is hereby corrected as shown below:

On the title page item [56]

FOREIGN PATENT DOCUMENTS, "2010081 2/1984 European Pat. Off. ." should read --20100811 2/1984 European Pat. Off. .-- and "31135555 10/1982 Fed. Rep. of Germany ." should read --3113555 10/1982 Fed. Rep. of Germany .--.

IN [57] ABSTRACT

Line 1, "A" should read --An--.

COLUMN 1

Line 54, "line" should read --line image.--.

COLUMN 2

Line 49, "by de-" should read --by a de- --.
Line 50, "thereof" should read --thereof,--.

COLUMN 3

Line 8, "N X M = 8 X 8" should read --N X M = 8 X 8,--.

Line 16, " (0→0→1→0→0→0→0→0).

1  2 "          should read

-- (0→0→1→0→0→0→0→0).
      1  2   --.

UNITED STATES PATENT AND TRADEMARK OFFICE
CERTIFICATE OF CORRECTION

PATENT NO. : 5,018,024

DATED : May 21, 1991

INVENTOR(S) : HIROSHI TANIOKA, ET AL.

It is certified that error appears in the above-identified patent and that said Letters Patent is hereby corrected as shown below:

COLUMN 3

Line 48, "order dot" should read --order: dot--.

COLUMN 4

Line 7, "process." should read --processing.--.
    Line 11, "case the" should read --case that the--.
    Line 15, "processing." should read --process.-- and "process" should read --processing--.
    Line 29, "binary digitize on" should read --binary-digitize an--.
    Line 33, "transition," should read --invention,--.
    Line 47, "a" should be deleted.
    Line 63, "transitions" should read --transitions.--.
    Line 65, "steps 4 and 5" should read --Steps 4 and 5--.

COLUMN 5

Line 11, "process" should read --processing--.
    Line 12, "into" should read --in--.
    Line 21, "example" should read --example,--.

COLUMN 6

Line 7, "stepwise" should be deleted.

COLUMN 7

Line 5, "in to" should read --into--.
    Line 55, "a" (first occurrence) should read --the--.

UNITED STATES PATENT AND TRADEMARK OFFICE
CERTIFICATE OF CORRECTION

PATENT NO. : 5,018,024
DATED : May 21, 1991
INVENTOR(S) : HIROSHI TANIOKA, ET AL.    Page 3 of 4

It is certified that error appears in the above-identified patent and that said Letters Patent is hereby corrected as shown below:

COLUMN 8

Line 3, "a" should be deleted.
    Line 5, "a" (first occurrence) should be deleted.
    Line 13, "Steps 4" should read --Step 4--.
    Line 15, "A step 10" should read --Step 10--.
    Line 17, "into" should read --in--.
    Line 21, "of" (second occurrence) should read --to--.
    Line 25, "example" should read --example,--.

COLUMN 10

Line 30, "a" should be deleted.
    Line 36, "$PS = T/\Delta D_{max}$ Steps 4 and 5" should read
        --$PS = T/\Delta D_{max}$. Steps 4 and 5--.
    Line 38, "case the" should read --case that the--
        and "the steps 4 and 5" should read
        --Steps 4 and 5--.
    Line 40, "a Step" should read --Step 6--.
    Line 55, "into" should read --in-- and "memory GM."
        should read --memory IM.--.
    Line 57, "memory GM" should read --memory IM--.

COLUMN 11

Line 14, "planer" should read --planar--.
    Line 35, "be" (second occurrence) should be deleted.

UNITED STATES PATENT AND TRADEMARK OFFICE
CERTIFICATE OF CORRECTION

PATENT NO. : 5,018,024

DATED : May 21, 1991

INVENTOR(S) : HIROSHI TANIOKA, ET AL.

It is certified that error appears in the above-identified patent and that said Letters Patent is hereby corrected as shown below:

COLUMN 14

Line 15, "half-tone processing" (second occurrence) should read --non-half-tone processing--.

Signed and Sealed this

First Day of December, 1992

Attest:

DOUGLAS B. COMER

Attesting Officer

Acting Commissioner of Patents and Trademarks